United States Patent [19]
Yoshikawa et al.

[11] Patent Number: 5,765,531
[45] Date of Patent: Jun. 16, 1998

[54] MULTI-VALVE ENGINE

[75] Inventors: Masaaki Yoshikawa; Shigenobu Uchiyama, both of Iwata, Japan

[73] Assignee: Yamaha Hatsudoki Kabushiki Kaisha, Iwata, Japan

[21] Appl. No.: 799,848

[22] Filed: Feb. 13, 1997

[30] Foreign Application Priority Data

Feb. 21, 1996 [JP] Japan .................. 8-033530

[51] Int. Cl.⁶ .................................................. F02F 1/00
[52] U.S. Cl. .................................................. 123/432
[58] Field of Search .......................... 123/432, 302, 123/193.1

[56] References Cited

U.S. PATENT DOCUMENTS

| | | | |
|---|---|---|---|
| 5,099,812 | 3/1992 | Yamada | 123/432 |
| 5,125,374 | 6/1992 | Saito | 123/432 |
| 5,186,140 | 2/1993 | Ueda et al. | 123/432 |
| 5,237,974 | 8/1993 | Isomoto et al. | 123/302 |
| 5,394,845 | 3/1995 | Noh et al. | 123/432 |
| 5,477,823 | 12/1995 | Uchida | 123/432 |

*Primary Examiner*—Marguerite McMahon
*Attorney, Agent, or Firm*—Knobbe, Martens, Olson & Bear LLP

[57] ABSTRACT

A five-valve per cylinder combustion chamber and intake passage arrangement. The side intake passages of the induction system are configured so that the flow exiting them extend toward each other at acute angles and intersect at a point outside of the cylinder bore axis for improving turbulence in the combustion chamber. A fuel injector is also provided which injects fuel only into the side intake passages.

11 Claims, 5 Drawing Sheets

5,765,531

1

MULTI-VALVE ENGINE

BACKGROUND OF THE INVENTION

This invention relates to a multi-valve engine and more particularly to an improved porting and valve arrangement for a three valve per cylinder engine and a fuel injection system therefor.

Although multi-valve engines for vehicle application generally were limited to high performance engines, their use in production car engines is becoming widespread. Four valve per cylinder engines are quite common in many vehicle applications. There has been an interest in further improving engine performance through the use of more than four valves per cylinder. Conventional four valve per cylinder engines employ two intake valves and two exhaust valves and the valves are placed generally symmetrically in the combustion chamber. It has been proposed to add at least one additional intake valve to attempt to improve engine performance. However, there are some difficulties when expanding the number of valves per cylinder beyond four.

One of the prime difficulties when utilizing three intake valves per cylinder is that the addition of a further valve and the requirement for it to be able to open and close to its full extent gives problems in the configuration of the combustion chamber. Generally, as the number of valves per cylinder increase, the actual surface area of the combustion chamber increases. This has several detrimental effects.

First, an increased surface area in the combustion chamber gives rise to increased quenching and may result in poor combustion. In addition, the clearance volume of the engine tends to increase and this causes a reduction in the compression ratio. Thus, the added performance that can be gained by the better breathing may be lost by the reduced compression ratio and excess quenching.

Therefore, arrangements have been provided wherein the combustion chamber is kept relatively small by positioning two of the intake valves close to the cylinder bore axis and on the sides of the combustion chamber. These are referred to as the side intake valves. A third, center intake valve is positioned between the two side valves and away from a plane that contains the axis of the cylinder bore and the axis of rotation of the crankshaft. This results in a valve placement wherein there may be some interference in the flow path from the individual intake passages.

Also, it is desirable to maintain some degree of turbulence in the combustion chamber, particularly at low speeds and low loads. The lower turbulence generated under these conditions with multi-valve engines causes the combustion propagation in the combustion chamber to be quite slow and poor low speed performance can result. This poor performance is not only in power, but also in fuel economy and exhaust emission control.

It is therefore a principal object of this invention to provide an improved multi-valve arrangement wherein the intake valves and their associated ports are configured so as to improve air flow into the combustion chamber and avoid interference in the air flow.

It is a further object of this invention to provide an improved induction passage and porting arrangement for a multi-valve engine wherein the intake passages and valve location is such to promote a uniform air flow in the combustion chamber and provide some degree of turbulence primarily at low and mid-range speeds.

If the engine is provided with multiple intake valves, there is also a necessity to ensure that the proper fuel/air ratio is introduced into the combustion chamber and that charge is appropriately distributed in the combustion chamber under all running conditions. Of course, this can be accomplished through the use of multiple fuel injectors, one for each intake port and separate control strategies for each injector, depending upon the port served. Obviously, however, this adds to the complexity of the engine. This coupled with the valve actuating mechanism can make the configuration of the cylinder head quite difficult.

It is, therefore, a still further object of this invention to provide an improved fuel injection system for a multi-valve engine.

It is a further objection of this invention to provide a fuel injection system for a multi-valve engine wherein a single fuel injector may be employed and still attain the desired fuel/air mixture that flows through the various intake passages.

SUMMARY OF THE INVENTION

A first feature of this invention is adapted to the embodied in an internal combustion engine having a cylinder block that defines a cylinder bore in which a piston reciprocates. The cylinder bore is closed at one end by a cylinder head. The cylinder head, cylinder bore, and piston are configured to form a combustion chamber that has a lens shape at its top dead center position. The lens is a convex shape defined by a curved recess in the head of the piston and a correspondingly shaped but oppositely facing recess formed in the cylinder head. An intake passage arrangement that terminates in three intake ports supplies an air charge to the combustion chamber. The intake ports are comprised of a pair of side intake ports that are disposed in the cylinder head on sides of the cylinder bore and which extend at least in part over a plane that contains the axis of the cylinder bore. A third, center intake port is formed between the side intake ports and is spaced from the plane and lies adjacent the periphery of the cylinder bore. The portions of the side intake passages that lead to the side intake ports have flow axes that are disposed at acute angles on the opposite sides of a second plane perpendicular to the first plane and also containing the axis of the cylinder bore. Thus, the flow of intake charge from these side intake passages tends to converge at this second plane and on the other side of the first plane.

Another feature of this invention is adapted to the embodied in an internal combustion engine having a cylinder block that defines a cylinder bore in which a piston reciprocates. The cylinder bore is closed at one end by a cylinder head. The cylinder head, cylinder bore, and piston are configured to form a combustion chamber. An intake passage arrangement that terminates in three intake ports supplies an air charge to the combustion chamber. The intake ports are comprised of a pair of side intake ports that are disposed in the cylinder head on sides of the cylinder bore and which extend at least in part over a plane that contains the axis of the cylinder bore. A third, center intake port is formed between the side intake ports and is spaced from the plane and lies adjacent the periphery of the cylinder bore. An intake passage arrangement having a common inlet and three diverging portions serves the intake ports. A fuel injection system injects fuel only into the portions serving the side intake ports.

DETAILED DESCRIPTION OF THE PREFERRED EMBODIMENT OF THE INVENTION

Figure 1:
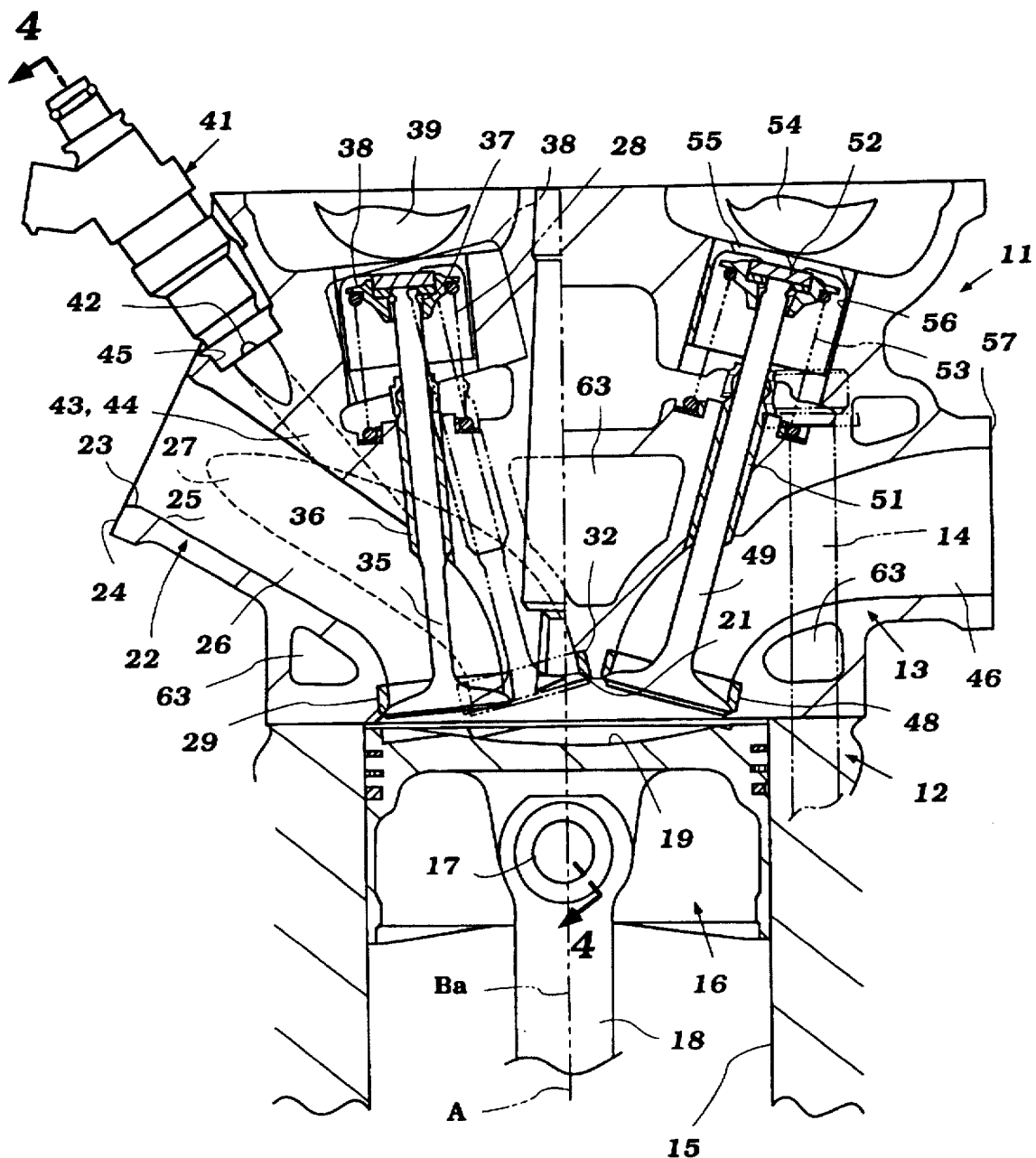
FIG. 1 is a cross-sectional view taken through a portion of a single cylinder of a multi-cylinder engine passing through the center of the center intake valve and the center of one of the exhaust valves and generally along the line 1—1 of FIG. 2.

Referring now and in detail to the drawings and initially primarily to FIG. 1, an internal combustion engine constructed in accordance with an embodiment of the invention is shown partially and is identified generally by the reference numeral 11. Inasmuch as the invention deals primarily with the combustion chamber, combustion chamber shape and induction and exhaust passage arrangement for a single cylinder of the engine 11, only a portion of the engine has been illustrated and will be described. Where components of the engine 11 are not illustrated or are not described in detail, reference may be had to any prior art construction for missing details in order to permit those skilled in the art to practice the invention.

Figure 2:
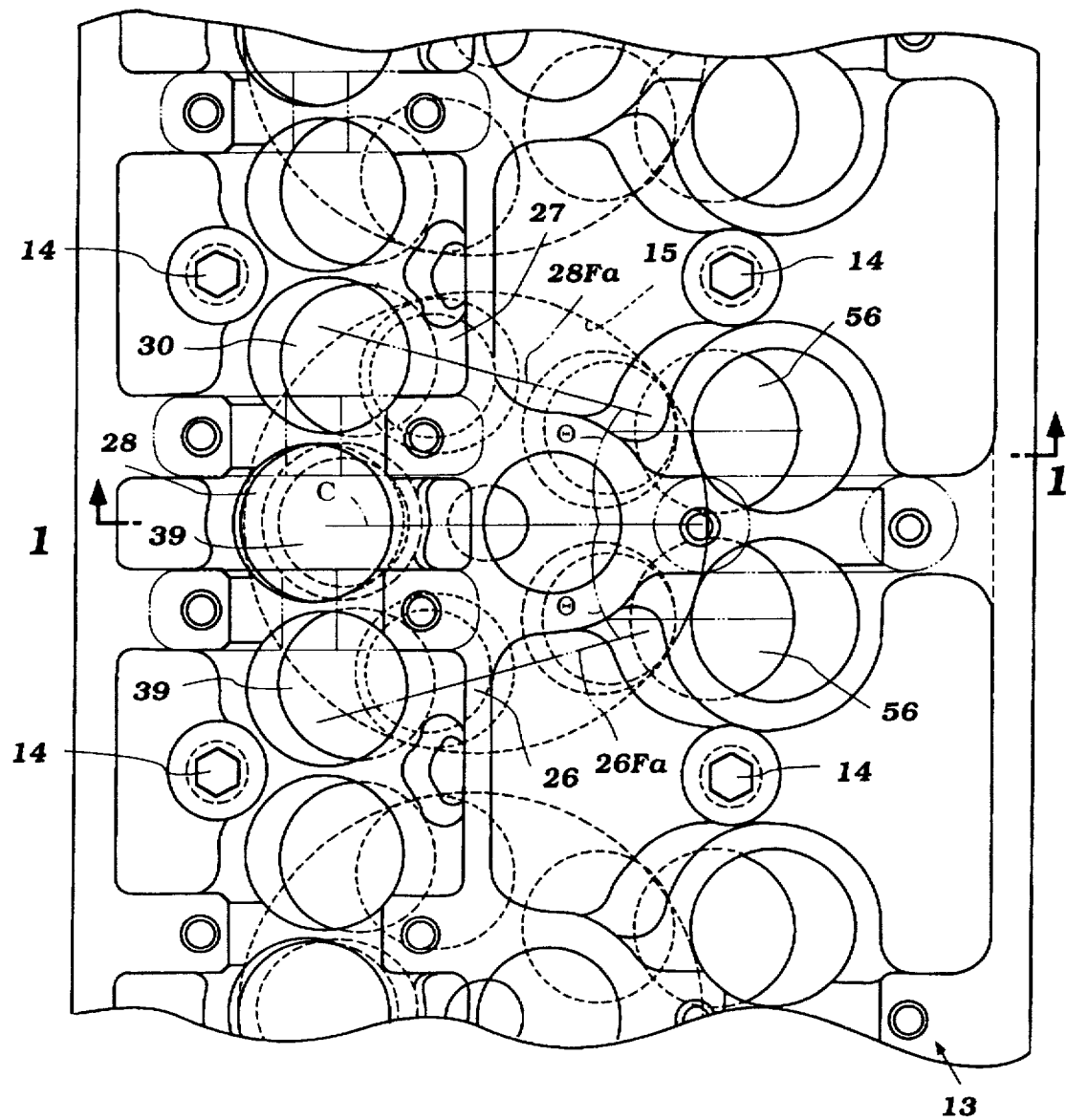
FIG. 2 is a top plan view of the cylinder head of the engine with the valves and valve actuating mechanism removed and shows the cylinder block cylinder bores in broken lines so as to associate the cylinder head with the cylinder block.

Also, and as may be seen best by FIG. 2, the engine 11 is depicted as being either of an in-line type or only one bank of an engine having plural cylinder banks. Obviously, those skilled in the art will readily understand how the invention may be practiced with engines having other cylinder numbers or other cylinder configurations.

The engine 11 is comprised of a cylinder block, indicated generally by the reference numeral 12, and a cylinder head, indicated generally by the reference numeral 13. The cylinder head 13 is affixed to the cylinder block 12 by a means that include fasteners 14. As will become apparent, the fasteners 14 are disposed so as to be equally spaced around each cylinder bore 15 of the cylinder block 12.

A piston, indicated generally by the reference numeral 16 is supported for reciprocation within each cylinder bore 15. The pistons 16 are connected by means of piston pins 17 to the small end of a connecting rod, shown partially and indicated by the reference numeral 18. The big end of the connecting rod which is not shown is journaled on a crankshaft of the engine in any known manner so as to drive the crankshaft and provide motive power output for the engine.

Figure 5:
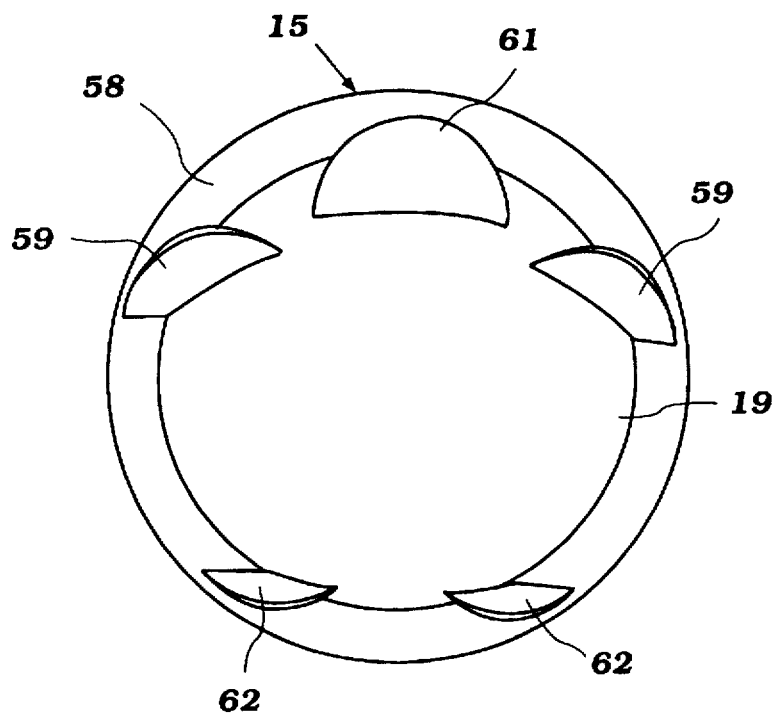
FIG. 5 is a top plan view showing the head of the piston.

The piston 16 as also seen in FIG. 5 has a recessed head portion formed primarily by a spherical segment recess 19. In a similar manner, the cylinder head 13 has a recessed lower surface indicated generally by the reference numeral 21 of a configuration shown primarily in FIG. 3 which cooperates with the piston recess 19 so as to form a combustion chamber which has what is known in the art as a lens shape. This shape results from the oppositely facing concave surfaces of the piston recess 19 and cylinder head recess 21. Actually, the cylinder head recess 21 is formed more like a wedge in order to accommodate the shape of the valve ports, as will now be described.

An intake passage arrangement, indicated generally by the reference numeral 22, extends through the cylinder head 13 from an inlet opening 23 formed in an outer surface 24 thereof. An intake manifold (not shown) which may include a filter is attached to this cylinder head surface 24 for collecting the air from an atmospheric source and delivering it to the individual openings 23.

Figure 4:
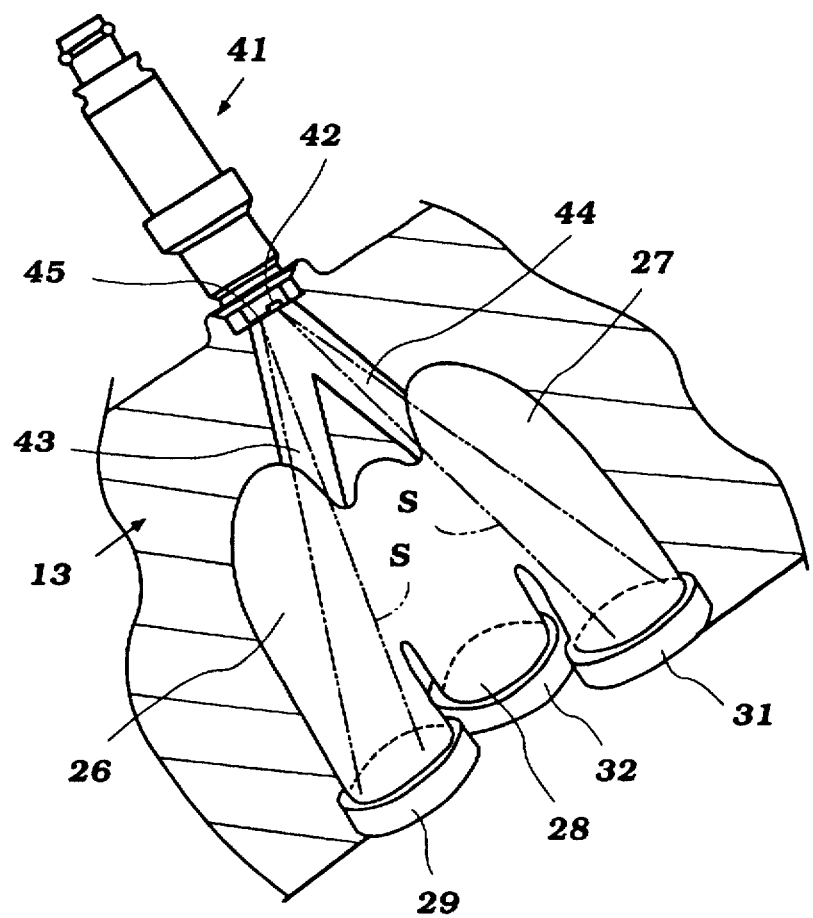
FIG. 4 is a cross-sectional view taken along the line 4—4 of FIG. 1 and shows the configuration of the fuel injector and its relationship to the intake passages.

The intake passage 22 has a configuration which is best shown in FIGS. 1 and 4, and which is comprised of a common inlet section 25 adjacent the opening 23 and which branches into three branch sections 26, 27 and 28. These branch sections 26, 27 and 28 comprise a pair of side branch sections (26 and 27) and a center branch section (28). These sections terminate at valve seats formed by valve seat inserts 29, 31 and 32.

Figure 3:
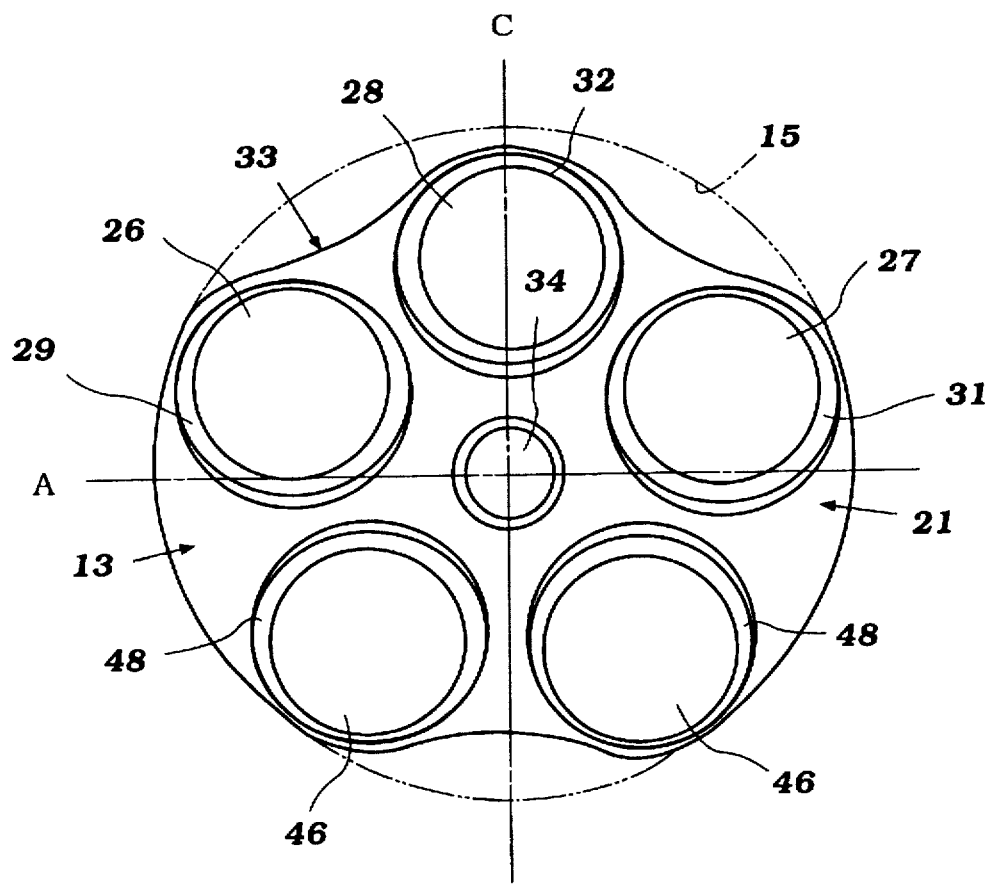
FIG. 3 is a bottom plan view of the cylinder head in the area of one cylinder bore and with the cylinder bore being shown in phantom lines for reference purposes.

As may be best seen in FIG. 3, the side valve seat inserts 29 and 31 extend at least partially across a first plane A which plane passes through the axis $B_a$ of the cylinder bore 15 and which plane A contains the axis of rotation of the crankshaft. The outer peripheral edges of the valve seats 29 and 31 also are disposed closed adjacent the cylinder bore 15 as seen in both FIGS. 2 and 3 wherein the cylinder bore 15 is indicated by a broken or phantom line.

The center intake valve seat 32 is disposed between the side intake valve seats 29 and 31 and further from the plane A than these other valve seat inserts. In fact, the center valve seat insert 32 is drawn inwardly from the cylinder bore 15 so as to form a squish area, indicated generally by the reference numeral 33 which surrounds the areas between the side intake valve seats 29 and 31 and the center intake valve seat 32. The purpose for this will be described later.

Also, it should be noted that the side intake passages 26 and 27 are configured so that they converge inwardly and their flow axes in this area are disposed at angles θ to a plane indicated at C which plane is perpendicular to the first mentioned plane A, and which contains the cylinder bore axis $B_a$. The point of intersection of these flow axes, indicated by the lines $26F_a$ and $28F_a$ is disposed so that it will pass axially beyond the peripheral edge of the cylinder bore 15.

As a result of this flow, the flow direction into the cylinder bore 15 from the intake passages will tend to flow across the cylinder bore, strike the cylinder bore surface, and be directed downwardly to contact the head of the piston 16. The flow then passes across the bowl surface 19 and to be directed upwardly along the opposite side of the cylinder bore surface to create a swirling action about a transverse axis in the cylinder bore. This motion is normally referred to as "tumble".

As the piston 16 approaches top dead center, the squish areas 33 will cause a further amplification of the flow velocity and will again cause the flow velocities to tend to converge toward the cylinder bore axis $B_a$.

A spark plug, indicated generally by the reference numeral 34 is mounted on this axis in the cylinder head 13 and thus there will be some stratification of the charge which has been formed in the manner which will be described in the vicinity of the spark plug 34 at the time of firing. This effect is particularly pronounced at low speeds and low loads, and hence will improve turbulence under these difficult conditions which combustion is otherwise quite slow.

Poppet type valves, indicated generally by the reference numeral 35, have their stem portions slidably supported in respective guides 36 fixed suitably in the cylinder head 13. These valves 35 are reciprocal about axes that are inclined to the plane A with the axes of the valves 35 associated with the side intake seats 29 and 31 lying in a plane that is disposed at an acute angle to the plane $B_a$. The center intake valve 35 associated with the center valve seat 32 also lies at an acute angle to this plane but much lesser than that of the side intake valves.

The valves 35 each have affixed to the upper ends of their stems keeper retainer assemblies 37. Coil compression springs 38 act against these keeper retainer assemblies 37 for holding the valves 35 in their closed position and sealing engagement with the respective valve seats 29, 31 and 32.

Thimble type tappets 38 are slidably supported in bores 39 formed in the cylinder head 13. These tappets 38 are engaged by the lobes of an intake cam shaft 40 for controlling the opening and closing of the intake valves 35 in a well known manner.

In order to mix fuel with the incoming air charge, a fuel injector, indicated generally by the reference numeral 41 is mounted in the cylinder head 13. The fuel injector 41 has a spray nozzle portion 42 that is received in a counter bore formed in the cylinder head 13 adjacent the surface 24. A pair of drilled passages 43 and 44 extend from the counter bore, indicated by the reference numeral 45, toward the side intake passage portions 26 and 27, as best seen in FIG. 4.

The spray nozzle 42 of the injector 41 is formed with a pair of ports so as to provide a pair of conical sprays that will flow into each of these drilled passages 43 and 44. The spray paths are indicated by the reference characters S in FIG. 4. As a result, the fuel that is injected under all running conditions will be directed into the combustion chamber through the side intake valve seats 29 and 31. Because of the aforenoted flow pattern of the intake air charge, the fuel will also be so distributed. The fuel flow will, under low speed low load conditions be somewhat stratified in the area of the spark plug 34, while a more homogeneous mixture will result under high speed high load conditions due to the greater air flow and the inherent mixing in the combustion chamber. Thus, the system provides good efficiency and good fuel distribution and fuel location control under all running conditions.

The charge which has been introduced into the combustion chamber and burned upon firing of the spark plugs 34 is discharged from the combustion chamber through exhaust passages 46 which are formed in the cylinder head 13 on the side of the plane A opposite the major portion of the intake passage sections 26 and 27 and the intake passage section 28.

The exhaust passages 46 extend from exhaust valve seats 48 which are formed in the cylinder head 13 in an appropriate manner. The valve seats 48 are valves by poppet type exhaust valves 49 which are mounted, like the intake valves 35, in the cylinder head 13 by valve guides 51. Keeper retainer assemblies 52 at the upper ends of the stems of the exhaust valves 51 are engaged by compression springs 53 for holding the exhaust valves 49 in their closed position.

An exhaust cam shaft 54 is mounted in the cylinder head 13 in an appropriate manner and opens the exhaust valves 49 via thimble tappets 55. These thimble tappets 55 are slidably supported in tappet receiving bores 56 formed in the cylinder head 13. The intake and exhaust camshafts 40 and 54 are driven by any suitable timing mechanism at one-half crankshaft speed.

The exhaust passages 46 terminate in an outer surface 57 of the cylinder head 13. An exhaust manifold (not shown) collects the exhaust gasses and delivers them to the atmosphere through an appropriate exhaust system.

It should be noted that the head of the piston 15 and specifically a squish forming flattened area 58 surrounding the recess 19 is formed with recesses 59 and 61 to clear the side and center exhaust valves 36. In a like manner, recesses 62 are provided for clearance for the exhaust valves 49.

Finally, the engine 11 is liquid cooled and a cooling jacket 63 is formed in the cylinder head 13. Coolant is circulated through this cooling jacket and the remaining cooling jackets of the engine in any known manner.

Thus, from the foregoing description it should be readily apparent that the described cylinder head arrangement, and particularly the valve and intake porting system provide a free flow of air into the combustion chamber and also directs the flow in such a way so as to improve turbulence, particularly under low speed, low load conditions. The injection arrangement also ensures that the mixture will be homogeneous at high speeds and high loads and can be somewhat stratified under low speed, low load conditions to ensure good combustion.

Of course, the foregoing description is that of a preferred embodiment of the invention, and various changes and modifications may be made without departing from the spirit and scope of the invention, as defined by the appended claims.

What is claimed is:

1. An internal combustion engine comprised of a cylinder block defining a cylinder bore, a piston reciprocating in said cylinder bore, a cylinder head affixed relative to said cylinder block and closing said cylinder bore, said cylinder head, said cylinder bore and said piston defining a combustion chamber having a generally lens shape when said piston is at a top dead center position, an intake passage arrangement extending through said cylinder head and terminating at three intake valve ports in said combustion chamber surface of said cylinder head, said intake ports being comprised of a pair of side intake ports disposed adjacent the periphery of said cylinder bore and extending at least in part over a first plane containing the axis of said cylinder bore and a center intake valve seat spaced further from said first plane and positioned between said side intake ports, and an intake passage arrangement serving said intake ports, said intake passage arrangement comprising a pair of side portions each serving a respective of said side intake ports, said side portions being configured adjacent said side intake ports so that the flow therefrom converges toward a second plane extending perpendicular to said first plane and also containing said cylinder bore axis.

2. An internal combustion engine as set forth in claim 1, wherein the flow axes of the side intake passage portions converge in the second plane at a position spaced outwardly of the cylinder bore.

3. An internal combustion engine as set forth in claim 1, further including a fuel injector mounted in said cylinder head and spraying fuel primarily into said side intake passage portions.

4. An internal combustion engine as set forth in claim 3, wherein the fuel injector sprays fuel into a pair of injection passages that intersect only the side intake passage portions.

5. An internal combustion engine as set forth in claim 4, wherein the flow axes of the side intake passage portions converge at a position in a third plane that is parallel to the second plane and which is spaced outwardly of the cylinder bore.

6. An internal combustion engine as set forth in claim 1, wherein the cylinder head surface and the piston surface that define the combustion chamber define a squish area extending around the peripheral edges of the intake ports adjacent the cylinder bore.

7. An internal combustion engine as set forth in claim 6, wherein the flow axes of the side intake passages converge at a position in a third plane that is parallel to the second plane and which is spaced outwardly of the cylinder bore.

8. An internal combustion engine as set forth in claim 6, further including a fuel injector mounted in said cylinder head and spraying fuel primarily into said side intake passage portions.

9. An internal combustion engine as set forth in claim 8, wherein the fuel injector sprays fuel into a pair of injection passages that intersect only the side intake passage portions.

10. An internal combustion engine as set forth in claim 9, wherein the flow axes of the side intake passage portions converge at a position in a third plane that is parallel to the second plane and which is spaced outwardly of the cylinder bore.

11. An internal combustion engine having a cylinder block that defines a cylinder bore in which a piston reciprocates, said cylinder bore being closed at one end by a cylinder head, said cylinder head, said cylinder bore and said piston forming a combustion chamber, an intake passage arrangement terminating in three intake ports for supplying an air charge to said combustion chamber, said intake ports being comprised of a pair of side intake ports that are disposed in said cylinder head contiguous to said cylinder bore and which extend at least in part over a plane that contains the axis of said cylinder bore, a third, center intake port formed between said side intake ports and spaced from said plane and lying adjacent the periphery of said cylinder bore, said intake passage arrangement having a common inlet and three diverging portions each serving a respective one of said intake ports, and a fuel injection system injecting fuel only into the portions serving said side intake ports through a pair of injection passages that intersect only the passage portions serving said side intake ports.

* * * * *